Aug. 2, 1927. Re. 16,691

T. E. MURRAY, JR

PRODUCING CERTAIN SHEET METAL ARTICLES

Original Filed Nov. 22, 1921

Inventor
THOMAS E. MURRAY JR.
By his Attorney
R. Anthony Mina

Reissued Aug. 2, 1927. Re. 16,691

UNITED STATES PATENT OFFICE.

THOMAS E. MURRAY, JR., OF BROOKLYN, NEW YORK.

PRODUCING CERTAIN SHEET-METAL ARTICLES.

Original No. 1,492,930, dated May 6, 1924, Serial No. 517,056, filed November 22, 1921. Application for reissue filed May 3, 1926. Serial No. 106,571.

My invention aims to provide improvements in the production of sheet metal axle housings and other bent or drawn sheet metal articles and in the production of certain intermediate articles in the manufacture of such housings or completed articles; by which improvements there is effected a considerable reduction in scrap loss and economy in cost.

The accompanying drawings illustrate embodiments of the invention.

Fig. 3 illustrates the method of obtaining the blank of Fig. 1 from a sheet;

Figure 1:
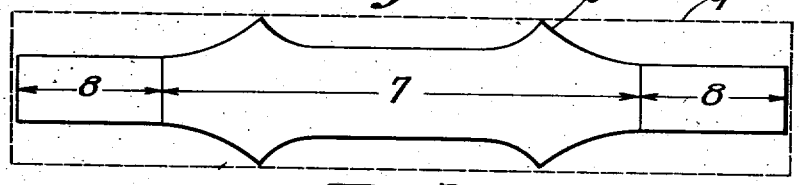
Figs. 1 and 2 are alternative plans of a blank.
Figure 2:
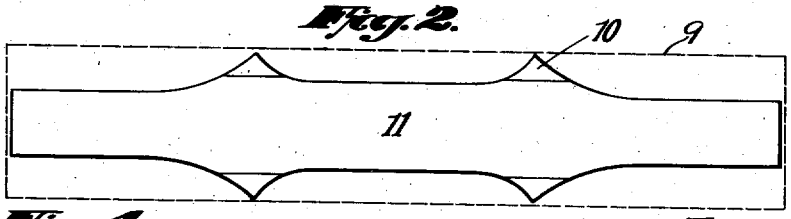
Figure 4:
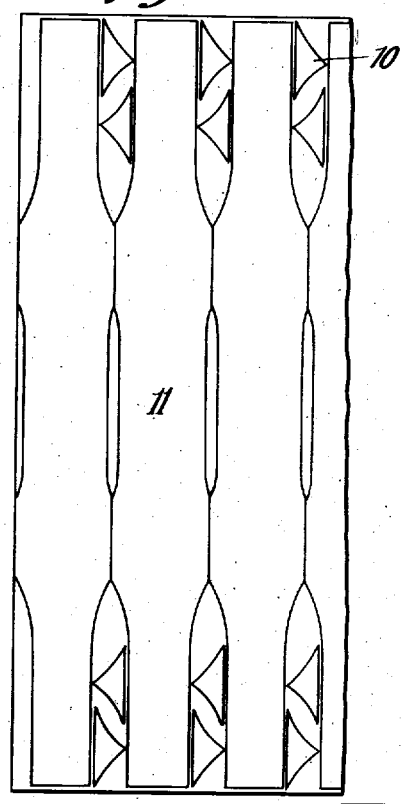
Fig. 4 illustrates the method of obtaining the blank of Fig. 2 from a sheet.
Figure 5:
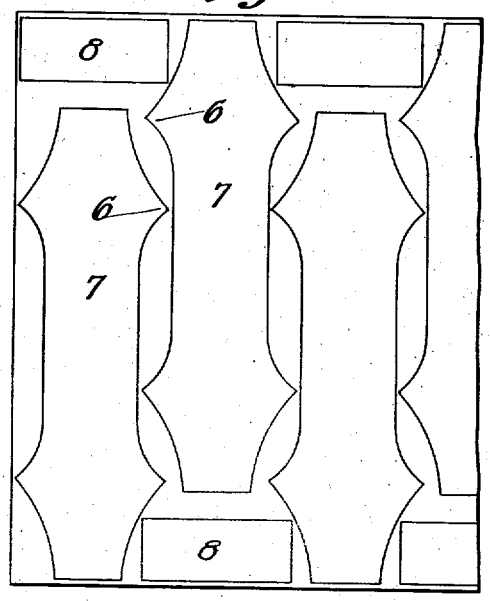
Fig. 5 illustrates an axle housing made in accordance with the invention.
Figure 7:
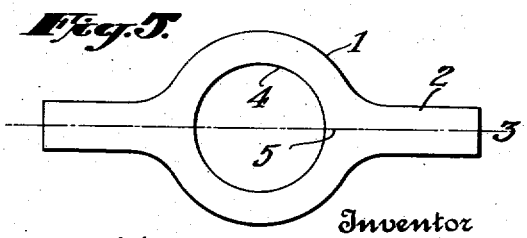
Figure 6:
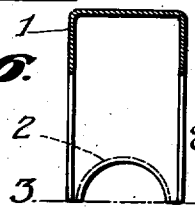
Fig. 6 is a cross-section of one of the segments.

Referring to the drawings, the housing in Fig. 5 has a central annular enlargement 1 and tubular extensions 2, the shapes of these parts in cross-section being indicated in Fig. 6. The housing is formed of two segments united along the edges indicated by the dotted line 3. Each segment is formed from one of the blanks hereinafter described by bending it longitudinally to form the central enlargement and transversely to form the flanges of the enlargement and the semicircular halves of the tubes. The total width of metal required for the central portion 1 is greater than that required for the tubular portions. In order that the inner edge 4 (Fig. 5) of the central part of the housing shall be circular the metal of the blank has to be wider at the point 5 where the tubular part merges into the central annular part than at either of the adjacent parts of the blank. This shape is shown in Figs. 1 and 2. To cut a number of blanks of this shape from a sheet is a comparatively wasteful operation because of the quantity of scrap occasioned by the projections 6 which form the widest part of the blank (and which correspond to the portion 5 of the finished housing). If the parts 6 be staggered with relation to each other on adjacent blanks, as in Fig. 3, there is still left a considerable quantity of metal at the ends of the blanks because of the off-setting of such ends. If the blanks be arranged with their ends in register, as in Fig. 4, the projections 6 will naturally space the blanks so far apart on a sheet as to involve a large amount of scrap between them. According to my invention the blanks are cut out, each in a number of parts which are afterwards fastened together, the parts being such as can be cut from the sheet with an economy of thirty per cent, more or less, as compared with the cutting out of each blank whole. Various arrangements of this character may be worked out, two such arrangements being shown in Figs. 1 and 3 and in Figs. 2 and 4 respectively.

The blank of Fig. 1 is made of three parts; a central part 7 of the extra width required for the enlarged part of the housing, including also the projections 6 and the tapering part extending therefrom to the narrower part of the blank, and two end portions 8 of uniform and comparatively narrow width corresponding to the tubular portions of the housing and welded to the central portion 7. On the sheet, Fig. 3, the wider portions 7 are arranged in staggered positions with the lateral projections 6 thereof overlapping. Between the ends of alternate pieces 7 there is a space of considerable depth and width, the parts being so proportioned that out of this space we may stamp the pieces 8 intended to form the end projections of the blank. By this means there is a large saving of sheet metal. It would require, including wastage, a quantity of metal indicated by the dotted rectangle 9 in Fig. 1 to cut the blanks out whole. From a sheet of a given size eight such blanks may be cut; whereas by the method of Fig. 3 twelve blanks can be cut from the same sheet. The part 8 it will be observed is taken of a length practically equal to the width of the blank through the projections 6, so as to fit into the spaces shown in Fig. 3. The blanking arrangement shown provides only one piece 8 for each piece 7. Additional pieces 8 may be cut from straight strips with practically no waste.

A similar economy can be secured by making the blank of only two pieces, a longer piece comprising the center 7 and one end 8 and a smaller piece comprising only the other end 8. Such longer pieces can be closely arranged on the sheet in the same way as in Fig. 3, the longer end of one blank overlapping the shorter end of the next and leaving no space sufficient for providing extra pieces 8; such extra pieces being cut from a separate strip. This would save one welding operation as compared with the two required to make up the blank in the manner of Fig. 3.

Instead of making the ends of the blank separate, I may make the corner projections separate as at 10, Fig. 2 and Fig. 4. Here the blank is formed of one piece 11 of full length, with its central width corresponding to that required for the center of the housing and with its end portions of the narrower width required for the tubular portions of the housing; and of four approximately triangular portions 10 welded on their edges to the part 11. The parts 11 are arranged on the sheet in lateral alignment with one another, with their wider central portions in contact and with spaces between their narrower end portions from which the pieces 10 are stamped out. With the proportions shown the width of the pieces 10 is such as to leave the pieces 11 of slight extra width so as to secure the necessary scrap between the ends for cutting out the pieces 10. Compared with the cutting out of each blank whole and using a quantity of metal indicated by the dotted rectangle 9 the method of Fig. 4 provides thirteen blanks from a sheet of sufficient size to furnish only eight blanks.

In each of the cases illustrated the saving in metal is more than sufficient to compensate for the cost of welding the parts together.

The parts which are stamped out separately from the sheet may be welded together before being bent up to form a segment or after such bending and at any subsequent stage in the forming of the housing.

The invention may be carried further, to the point of removing both the lateral projections and the end projections, or rather omitting these from the first blanking operation, and subsequently forming and applying them to the intermediate part.

The blank with lateral and end projections, or with one or more of such projections, separately stamped out and welded to the remainder furnishes a very convenient article of manufacture for subsequent conversion into a segment of an axle housing, or for segments of various analogous structures; and for various articles which are bent or drawn from sheet metal and which, as far as their method of production is concerned, are wholly or in part equivalent to the segments described. The separate segments also may be considered as intermediate but complete articles of manufacture, for subsequent conversion into housings in separate machines or plants as and when needed.

Though I have described with great particularity of detail certain embodiments of my invention, yet it is not to be understood therefrom that the invention is restricted to the particular embodiments disclosed. Various modifications may be made by those skilled in the art without departure from the invention as defined in the following claims.

What I claim is:

1. In the making of blanks for segments of axle housings or the like, such blanks having an intermediate portion, two end portions projecting therefrom and lateral projections at the ends of the intermediate portion, the method which consists in cutting out separately different parts of the blanks from staggered and overlapping positions in a sheet and welding said parts together edge to edge to make the complete blanks.

2. In the making of blanks for segments of axle housings or the like, such blanks having an intermediate portion, two end portions projecting therefrom and lateral projections at the ends of the intermediate portion, the method which consists in cutting out from a sheet parts including such intermediate portions staggered to overlap such lateral projections, and cutting out from the sheet between the extended ends of said staggered parts a second series of parts adapted to form end portions of the blanks.

3. In the making of blanks for segments of axle housings or the like, such blanks having an intermediate portion, two end portions projecting therefrom and lateral projections at the ends of the intermediate portion, the method which consists in cutting out from a sheet parts including such intermediate portions staggered to overlap such lateral projections and cutting out from the sheet between the extended ends of said staggered parts a second series of parts adapted to form end portions of the blanks and welding said parts together edge to edge to make the complete blanks.

4. In the making of blanks for segments of axle housings or the like, such blanks having an intermediate portion, two end portions projecting therefrom and lateral projections at the ends of the intermediate portion, the method which consists in cutting out from a sheet parts including only such intermediate portions and lateral projections, which parts are staggered to overlap the lateral projections, and cutting out from the sheet between the extended ends of said staggered parts a second series of parts adapted to form end portions of the blank.

5. A segment for use in the making of axle housings or the like, said segment being bent transversely for welding it edge to edge to an adjacent segment and comprising separately formed parts of sheet metal of suitable shape welded together edge to edge.

6. A segment for use in the making of axle housings or the like, said segment being bent transversely for welding edge to edge to an adjacent segment and having a central portion which is bent longitudinally and said segment comprising separately formed parts of sheet metal of suitable shape welded together edge to edge.

7. A segment for use in the making of axle housings or the like, said segment comprising a central portion bent longitudinally and transversely and end portions bent transversely and comprising separately formed parts of sheet metal of suitable shape welded together edge to edge.

8. A segment for use in the making of axle housings or the like said segment being formed of pieces of sheet metal welded together edge to edge and the whole bent up to the desired shape.

9. A sheet metal blank for forming a segment of an axle housing or the like said blank having an intermediate portion with lateral and end projections therefrom, at least one of said projections having an edge butt welded to the edge of the remainder of the blank.

10. A sheet metal blank for forming a segment of an axle housing or the like said blank having an intermediate portion with lateral and end projections therefrom, said end projections being separate stampings welded to the ends of the intermediate portion.

11. In the production of a segment of an axle housing or the like, the method which includes cutting out different parts of suitable shape from overlapping positions in a sheet and welding them together edge-to-edge to produce a flat blank and bending the latter transversely.

12. In the production of a segment of an axle housing or the like, the method which includes cutting out different parts of suitable shape from overlapping positions in a sheet and welding them together edge-to-edge to produce a flat blank of different widths at different points in its length and bending the latter transversely.

13. In the production of a segment of an axle housing or the like, the method which includes cutting out different parts of suitable shape from overlapping positions in a sheet and welding them together edge-to-edge to produce a flat blank and bending the latter transversely and bending the central portion of it longitudinally.

14. In the production of a segment of an axle housing or the like, the method which includes cutting out different parts of suitable shape from overlapping positions in a sheet and welding them together edge-to-edge to produce a flat blank and bending the end portions of the blank transversely and the central portion both transversely and longitudinally.

In witness whereof, I have hereunto signed my name.

THOMAS E. MURRAY, Jr.